Aug. 16, 1932.  L. DALE BROWN  1,871,837
MACHINE FOR INSERTING EDIBLE FILLER INTO A ROLL OR THE LIKE
Filed July 11, 1931   3 Sheets-Sheet 1
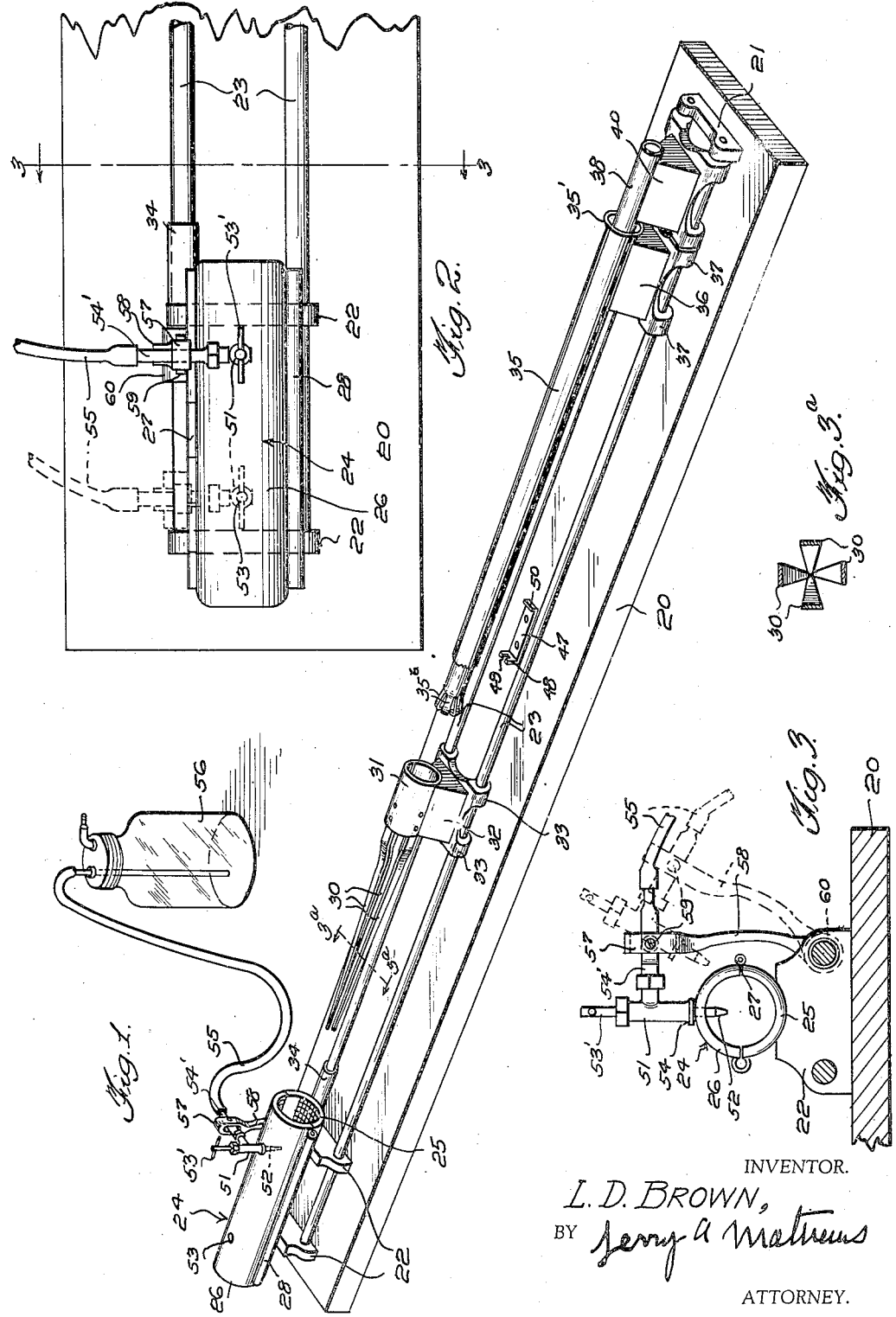
INVENTOR.
L. D. BROWN,
BY *Jerry A. Mathews*
ATTORNEY.

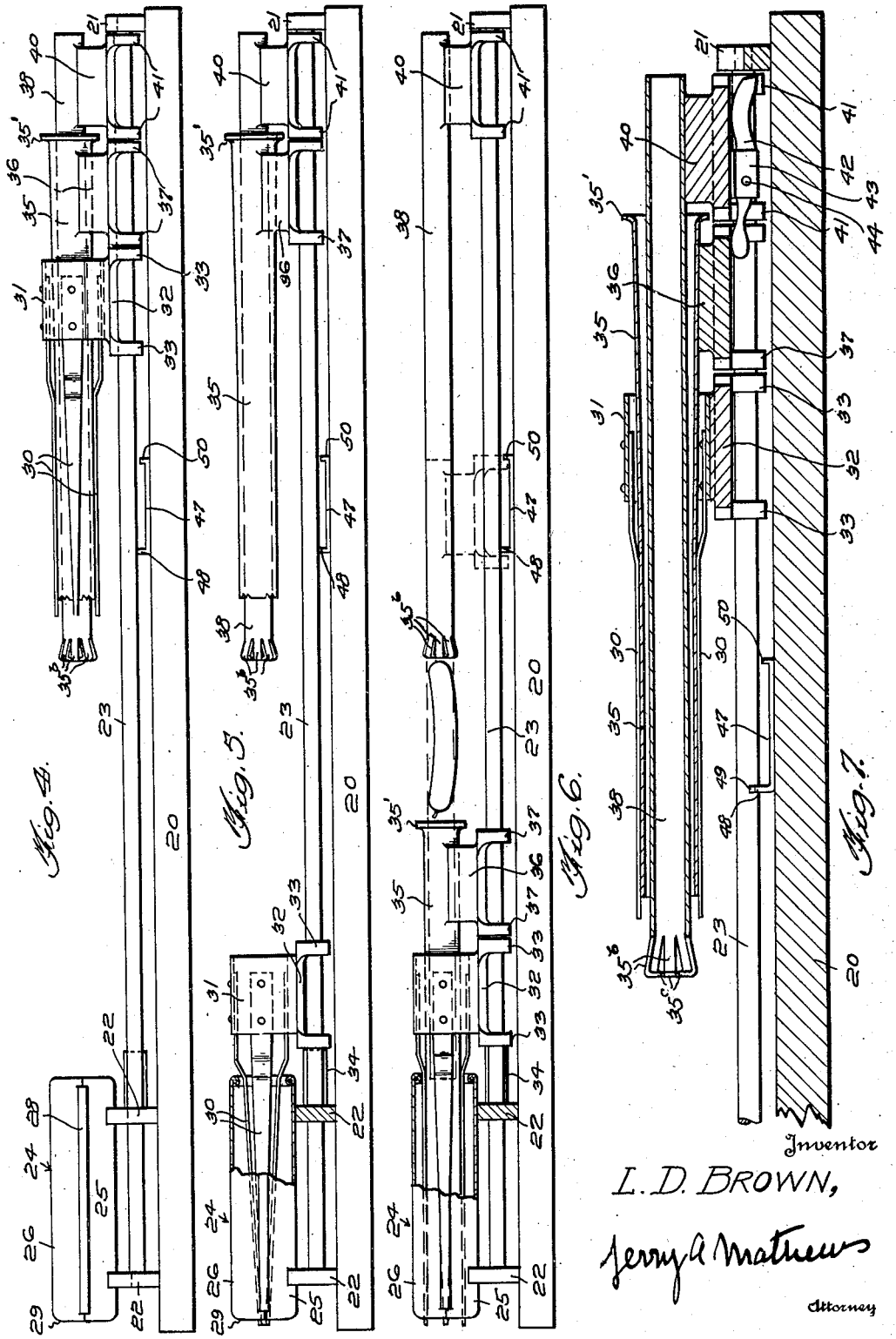

Aug. 16, 1932.   L. DALE BROWN   1,871,837
MACHINE FOR INSERTING EDIBLE FILLER INTO A ROLL OR THE LIKE
Filed July 11, 1931   3 Sheets-Sheet 3
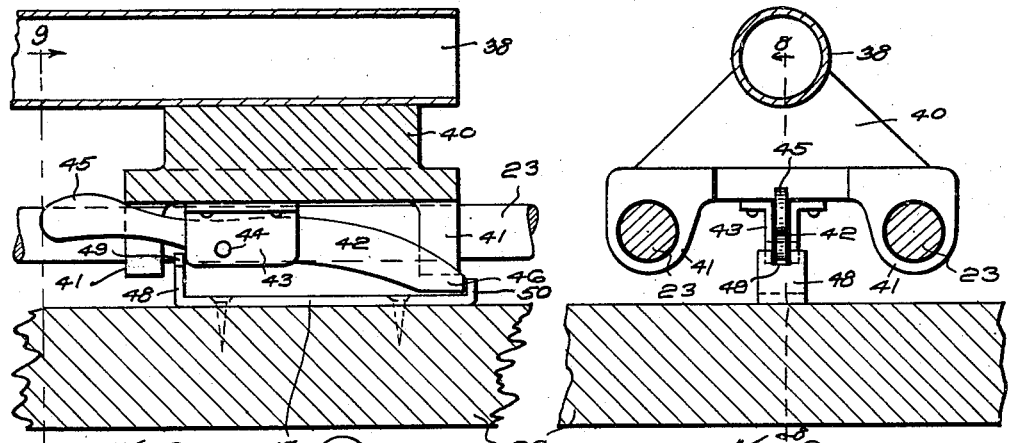
Fig. 8.   Fig. 9.
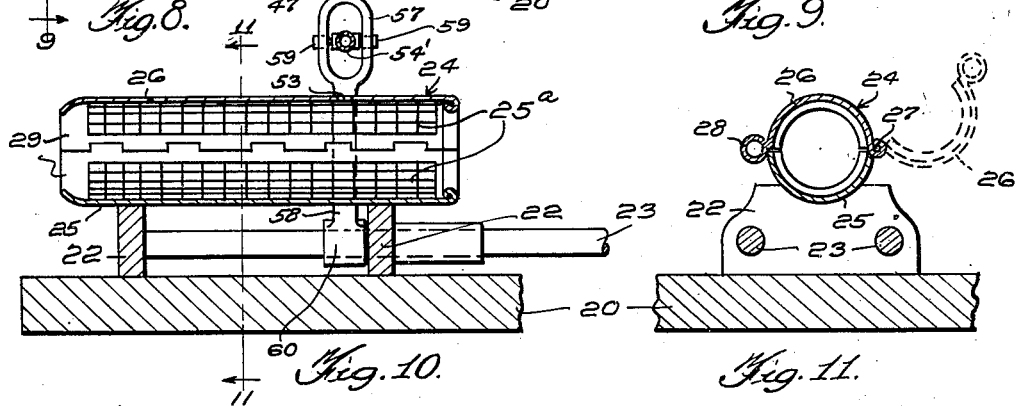
Fig. 10.   Fig. 11.
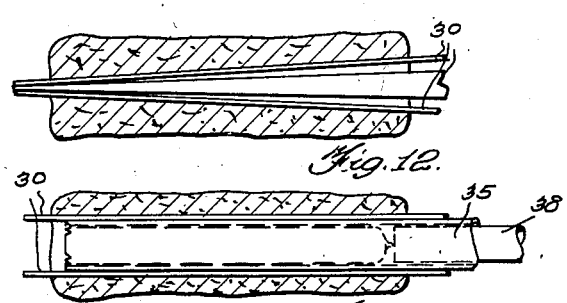
Fig. 12.
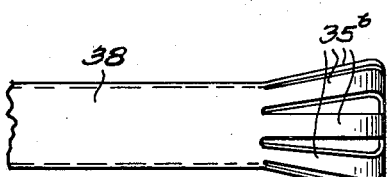
Fig. 16.
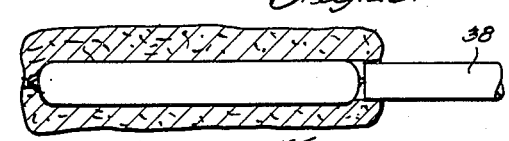
Fig. 13.
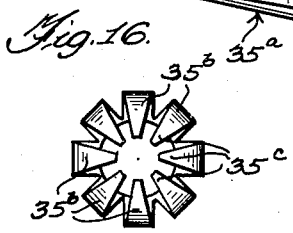
Fig. 17.
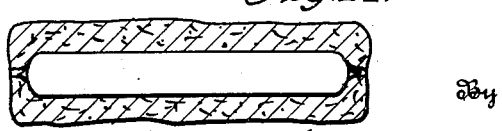
Fig. 14.
Fig. 15.
Inventor
L. D. BROWN,
By Jerry A. Matthews
Attorney Patented Aug. 16, 1932

1,871,837

UNITED STATES PATENT OFFICE

LORENZO DALE BROWN, OF CONCORD, NEW HAMPSHIRE

MACHINE FOR INSERTING EDIBLE FILLER INTO A ROLL OR THE LIKE

Application filed July 11, 1931. Serial No. 550,265.

My invention relates to a machine for introducing an edible filler into a roll, or the like.

An important object of the invention is to provide a machine of the above-mentioned character, which may be employed to introduce a frankfurter into a long roll, without slitting the outer side of the roll, so that the frankfurter will be located substantially centrally within the roll and practically completely enclosed thereby.

A further object of the invention is to provide means for applying mustard, or the like, to the edible filler after it has been inserted into the roll.

A further object of the invention is to provide a machine of the above-mentioned character, which may be quickly and conveniently manipulated.

Other objects and advantages of the invention will be apparent during the course of the following description.

In the drawings forming a part of this specification and in which like numerals are employed to designate corresponding parts throughout the same, Figure 1 is a perspective view of a machine embodying my invention, Figure 2 is a fragmentary plan view of the same, Figure 3 is a transverse section taken on line 3—3 of Figure 2, Figure 3ª is a transverse section taken on line 3ª—3ª of Figure 1.

Figure 4 is a side elevation of the machine, showing the operating elements in the starting position, Figure 5 is a similar view showing the opening and expanding element shifted to the end of its left hand position, Figure 6 is a similar view showing the combined expanding and feeding tube shifted to the left, Figure 7 is a central vertical longitudinal section through the opening and expanding element, combined expanding and feeding tube, and ejector, the same being shown in the starting position, Figure 8 is a longitudinal section taken on line 8—8 of Figure 9, Figure 9 is a transverse section taken on line 9—9 of Figure 8, Figure 10 is a central vertical longitudinal section through the roll holding case, Figure 11 is a transverse section taken on line 11—11 of Figure 10, Figure 12 is a longitudinal section through the roll, showing the opening and expanding element therein, Figure 13 is a similar view illustrating the next step in the operation of the machine, with the combined expanding and feeding tube shifted into the opening and expanding element, and the ejector arranged in the forward position.

Figure 14 is a similar view illustrating the next step in the operation of the machine, the opening and expanding element and the combined expanding and feeding tube being returned to the starting position and the ejector in the forward position.

Figure 15 is a similar view showing the completed product,

Figure 16 is an enlarged fragmentary side elevation of the ejector, and

Figure 17 is an end elevation of the same.

In the drawings, wherein for the purpose of illustration is shown a preferred embodiment of my invention, the numeral 20 designates a base, upon which are rigidly mounted transverse supports 21 and 22, projecting above the base, as shown. Rigidly attached to these supports is a pair of parallel guide rods 23, which extend longitudinally of the base and are vertically spaced from the same.

The numeral 24 designates a roll-holding device or case, preferably embodying a lower casing section 25, which is rigidly mounted upon the supports 22, and an upper casing section 26 which is hinged to the lower casing 25, as shown at 27. The upper casing section 26 is preferably provided with a rolled edge 28, at its free edge, to aid in its opening and closing movement. The forward ends of the casing sections 24 and 25 preferably taper inwardly, as more clearly shown at 29, Figure 10. The casing sections 24 and 25 are lined with an open wire fabric 25ª, to render these surfaces rough for holding engagement with the roll. A long roll is inserted within this holding device and held securely therein by pressure exerted upon the upper casing section or cover 26, whereby the roll is securely held against longitudinal displacement, upon the action of the outer elements.

The machine embodies an opening and expanding device including resilient blades 30, which are arranged in a circular group and extend into a cylindrical sleeve 31, and are rigidly attached thereto by any suitable means. These resilient blades are tensioned to contract and to converge forwardly, thereby forming a forwardly tapering element. The sleeve 31 is rigidly mounted upon a carriage 32, having apertured knuckles 33, slidable upon the rods 23. The forward movement of the carriage 32 is limited by a stop sleeve 34, arranged in the path of travel of one of the knuckles 33, as shown.

The numeral 35 designates a combined expanding and feeding tube, the forward end of which is preferably serrated. This tube is rigidly mounted upon a carriage 36, having apertured knuckles 37, slidable upon the guide rods 23. The sleeve 31 has a much larger diameter than the tube 35, and when the tube is moved forwardly, it passes concentrically through the sleeve 31, without contacting therewith, or with the rear end of the resilient blades 30. When the tube 35 is moved forwardly sufficiently, it engages with these blades 30, and expands the same. The combined expanding and feeding tube has its rear portion longitudinally tapered and increases in diameter rearwardly with its rear end flaring, and provided with a guide flange 35'.

Operating in conjunction with the combined expanding and feeding tube 35 is an ejector 38, which is preferably tubular, and has its forward end provided with a resilient circumferentially contractable head 35ª. The head 35ª is formed by longitudinally slitting the end of the tubular ejector, affording resilient prongs or strips 35ᵇ, which are bent to diverge forwardly, with their free ends bent inwardly and transversely, affording radial extensions 35ᶜ. When the resilient head 35ª engages within the flaring flange 35', it is compressed thereby and enters the tube 35 to have a snug sliding fit therein, the radial extensions 35ᶜ being drawn together to form an ejector end, for engaging with the frankfurter. This ejector is rigidly mounted upon a carriage 40, having apertured knuckles 41, slidable upon the rods 23.

Means are provided to limit the forward movement of the ejector carriage 40, and to lock the same in the forward position, comprising a dog 42, arranged between a pair of knuckles 43, and pivoted thereto at 44. The pivot 44 is arranged nearer the forward end of the dog whereby the dog is gravity operated so that its rear end will automatically descend. The knuckles 42 are arranged beneath the carriage 40 and are rigidly attached thereto. The dog 42 has the top of its forward end rounded, as shown at 45, while its rear end is in the form of a shoulder 46.

The numeral 47 designates a combined stop and keeper, in the form of a plate arranged to be rigidly attached to the base 20, at a desired distance from the roll holding device 24. The forward end of this plate is bent upwardly into a stop 48, having a slot 49, to receive a portion of the dog 42. The rear end of the plate 47 is bent upwardly into a vertical stop 50, to engage with the shoulder 46 of the dog. The rounded portion 45 of this dog projects above the adjacent carriage 40, and will be engaged by the carriage 36, and depressed thereby.

Means are provided to supply mustard to the frankfurter after it has been inserted in the roll. This means comprises a valve 51, having a nozzle 52, adapted to be inserted into openings 53, formed in the upper casing section 24. The nozzle is preferably tapered so that it will readily penetrate through the roll, and the flange 54 limits the downward movement of the nozzle so that it will stop adjacent to the exterior of the frankfurter. The valve has a manually operated valve element 53'. The valve is carried by a tubular stem 54', to which is attached a flexible hose 55, leading to a receptacle 56 for holding mustard or other condiment in a liquid form. This condiment is held under air pressure within the receptacle and is fed by such pressure through the valve 51. The stem 54' is arranged within a yoke 57 of an adjustable arm 58, and is pivotally connected therewith by pivot elements 59, engaging opposite sides of the same. The adjustable arm is provided at its lower end with an apertured head 60, which is slidably mounted upon the adjacent rod 23 to move longitudinally thereof and to turn thereon.

The operation of the machine is as follows:

The opening and expanding element 30, the combined expanding and feeding tube 35, and the ejector 38 are first shifted to the rearmost position, as shown in Figure 4. The arm 58 is swung rearwardly from the holding device 24 and may assume a generally horizontal position. The top section 26 is now shifted to the open position, and the roll inserted into the lower section 25, after which the top section is closed, and is retained in such closed position by pressure from the left hand. The carriage 32 is now shifted to the left until it engages the stop 34, this carriage assuming the position shown in Figure 5. The combined opening and expanding element has now entered the roll. The combined expanding and feeding tube 35 is now shifted forwardly until the carriage 36 is stopped by the carriage 32, as shown in Figure 6. When the tube 35 passes between the resilient blades 30, such blades are expanded, as shown in Figures 6 and 13. As shown in Figure 6, the frankfurter may now be fed into the rear end of the tube 36, and the next operation is to shift the carriage 40 to the end of its forward travel, which is limited by the knuckles 43 engaging with the stop 48, the forward end of the ejector 38 being then slightly within the rear end of the roll, and the frankfurter being forced forwardly within the tube 35 until it is located completely within the roll, as shown in Figure 13. When the carriage 40 is thus shifted to the forward position, it is locked in this position against return movement, by the dog 42 dropping behind the stop 50. While the ejector 38 is thus locked against longitudinal rearward movement, the operator next shifts the carriage 32 rearwardly, moving the carriage 36 with it. The blades 30 and the tube 35 are thus completely removed from within the roll while the ejector 38 remains within the rear end of the roll, as shown in Figure 14. A further movement of these carriages causes the carriage 36 to engage with the rounded surface 45 of the dog, swinging the shoulder 46 upwardly to clear the stop 50, thus releasing the carriage 40, so that the three carriages may be shifted to the end of the starting position, Figure 4. This having been done, the adjustable arm 54 is brought into transverse alignment with either opening 53 and the nozzle 52 is passed through the opening 53, penetrating the roll and terminating exterior of and adjacent to the surface of the frankfurter. The valve element 53' is now opened, and mustard or the like is applied to the frankfurter within the roll. The nozzle 52 may thus be passed through both openings 53 and removed therefrom, subsequently to which the upper casing 26 is shifted to the upper position and the roll removed.

While the machine is shown as used for introducing frankfurters into a roll, other edible fillers may be fed to the center of the roll, such as ground hamburger, or the like. Such material would be introduced into the rear end of the tube 35 by any suitable means and fed forwardly therein by means of the ejector.

It is to be understood that the form of my invention herewith shown and described is to be taken as the preferred example of the same, but that various changes in the shape, size and arrangement of parts may be resorted to without departing from the spirit of the invention or the scope of the subjoined claims.

Having thus described my invention, what I claim is:

1. In a machine of the character described, a device for holding a roll, an opening and expanding element for movement in the roll, a combined expanding and feeding tube for movement into the opening and expanding element to expand the same, and an ejector for movement into the combined expanding and feeding tube.

2. In a machine of the character described, a device for surrounding and holding a roll against longitudinal and lateral displacement, an opening and expanding element for movement into the roll means to expand the opening and expanding element, and means movable toward the holding device for engaging an edible filler and forcing the same into the opening and expanding element after the same has been introduced into the roll.

3. In a machine of the character described, a device for surrounding and holding a roll and holding the same against longitudinal and lateral displacement, a movable carrier, a plurality of normally converging blades secured to the carrier and adapted to be passed into the holding device means to expand said blades, and means movable toward the holding device for engaging an edible filler and forcing the same into the space between the blades.

4. In a machine of the character described, a device for holding a roll, a movable carrier, a plurality of normally converging blades secured to the carrier and adapted to be passed into the holding device, and means to enter the space between the blades to expand the same and to also guide an edible filler into such space.

5. In a machine of the character described, a roll holding device, an opening and expanding element for movement into the holding device, a combined expanding and feeding tube for movement into the expanding element to expand the same, an ejector for movement into the combined expanding and feeding tube, and means to lock the ejector in the forward position when shifted to such position.

6. In a machine of the character described, a relatively stationary roll-holding device, a reciprocatory opening and expanding element for movement into the holding device, a reciprocatory combined expanding and feeding tube for movement into the expanding element to expand the same, a reciprocatory ejector for movement into the combined expanding and feeding tube, and means to lock the ejector in the forward position when shifted thereto, said locking means being so constructed that the same is released by engagement with the reciprocatory combined expanding and feeding tube.

7. In a machine of the character described, a case for holding a roll, a tapered expansible element for movement into the case, means for expanding the element within the case to provide a cavity within the roll, means for introducing an edible filler into the expanded element, and means for conducting a condiment to the cavity.

8. In a machine of the character described, a roll-holding case having an opening formed therein, an expansible element for movement in the case to enter the roll, means to expand said element to provide a cavity within the roll, means for introducing an edible filler into the expanded element, and an element to be passed through the opening in said case and the wall of the roll for supplying a condiment to said cavity.

9. In a machine of the character described, a case for holding a roll embodying upper and lower hinged sections, the upper section having a plurality of openings formed through its side, a guide element extending longitudinally of the case, a support mounted upon the slide to move longitudinally thereof, a tubular element pivoted upon the support and adapted to be inserted through the openings in the upper case section, means to supply a condiment to the tubular element, and means movable into the case to form a cavity within the roll and introduce an edible filler into said cavity.

10. In a machine of the character described, a case for holding a roll embodying upper and lower sections, the upper section having a plurality of openings formed therein, a guide element extending longitudinally of the case, a support pivotally and slidably mounted upon the guide element, a tubular element pivotally mounted upon the support and adapted to be passed through said openings, means to supply a condiment to the tubular element, and means movable into the case to form a cavity in the roll and to introduce an edible filler into such cavity.

In testimony whereof I affix my signature.

LORENZO DALE BROWN.